(12) United States Patent
Nádas et al.

(10) Patent No.: US 12,500,850 B2
(45) Date of Patent: Dec. 16, 2025

(54) VIRTUAL DUAL QUEUE CORE STATELESS ACTIVE QUEUE MANAGEMENT (AQM) FOR COMMUNICATION NETWORKS

(71) Applicant: TELEFONAKTIEBOLAGET LM ERICSSON (PUBL), Stockholm (SE)

(72) Inventors: Szilveszter Nádas, Budapest (HU); Ferenc Fejes, Budapest (HU); Sandor Laki, Budapest (HU); Gergö Gombos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 478 days.

(21) Appl. No.: 17/918,712

(22) PCT Filed: Feb. 23, 2021

(86) PCT No.: PCT/EP2021/054377
§ 371 (c)(1),
(2) Date: Oct. 13, 2022

(87) PCT Pub. No.: WO2021/213711
PCT Pub. Date: Oct. 28, 2021

(65) Prior Publication Data
US 2023/0142425 A1    May 11, 2023

Related U.S. Application Data

(60) Provisional application No. 63/014,918, filed on Apr. 24, 2020.

(51) Int. Cl.
*H04L 47/6295* (2022.01)
*H04L 47/31* (2022.01)
*H04L 47/36* (2022.01)

(52) U.S. Cl.
CPC .......... *H04L 47/6295* (2013.01); *H04L 47/31* (2013.01); *H04L 47/365* (2013.01)

(58) Field of Classification Search
CPC .... H04L 47/6295; H04L 47/31; H04L 47/365
See application file for complete search history.

(56) References Cited

U.S. PATENT DOCUMENTS 6,738,386 B1 *  5/2004  Holmqvist .............. H04L 47/10
                                                      370/428
2012/0030451 A1 *  2/2012  Pong ................... G06F 9/30018
                                                      712/E9.016
(Continued)

FOREIGN PATENT DOCUMENTS

WO    2014189422 A1    11/2014
WO    2015172815 A1    11/2015
(Continued)

OTHER PUBLICATIONS

Alizadeh, M., et al. "Less is more: trading a little bandwidth for ultra-low latency in the data center." Presented as part of the 9th {USENIX} Symposium on Networked Systems Design and Implementation ({NSDI} 12). 2012.
(Continued)

*Primary Examiner* — Sujoy K Kundu
*Assistant Examiner* — Weibin Huang

(57) ABSTRACT

A method for handling data packets by a communication node in a communication network, the method comprising storing received data packets in at least two physical queues, wherein a first of said at least two physical queues is associated with low latency data packets and a second of said at least two physical queues is associated with high latency data packets, wherein each data packet is stored in one of the at least two physical queues based on a delay characteristic associated with the data packet, for each received data packet, storing an associated information
(Continued)

record in at least two virtual queues, VQs, wherein associated information for data packets stored in said high latency physical queue is stored in a second of said at least two virtual queues and wherein associated information for data packets stored in said low latency physical queue is stored in both said first and second of said at least two virtual queues, serving data packets from the at least two physical queues, using at least two Congestion Threshold Values, CTVs, wherein a first of said at least two CTVs is applicable to data packets in said low latency physical queue and wherein both said first and second of said at least two CTVs are applicable to data packets in said low latency physical queue and data packets in said high latency physical queue, wherein said at least two CTVs are used for at least one of dropping and marking packets based on their associated information.

25 Claims, 12 Drawing Sheets

(56) References Cited

U.S. PATENT DOCUMENTS

| | | | | |
|---|---|---|---|---|
| 2014/0341026 | A1* | 11/2014 | Gahm | H04N 21/47217 370/232 |
| 2016/0065484 | A1* | 3/2016 | Suzuki | H04L 47/623 370/415 |
| 2016/0294696 | A1* | 10/2016 | Gafni | H04L 49/3081 |
| 2017/0171099 | A1* | 6/2017 | Shpiner | H04W 28/02 |
| 2022/0321493 | A1* | 10/2022 | Rollet | H04L 47/24 |

FOREIGN PATENT DOCUMENTS

| | | | | |
|---|---|---|---|---|
| WO | WO-2019072397 | A1 * | 4/2019 | ......... H04L 47/2441 |
| WO | 2019108102 | A1 | 6/2019 | |
| WO | 2019207403 | A1 | 10/2019 | |
| WO | 2019219225 | A1 | 11/2019 | |

OTHER PUBLICATIONS

B. Briscoe, Ed., et al., "Low Latency, Low Loss, Scalable Throughput (L4S) Internet Service: Architecture draft-ietf-tsvwg-I4s-arch-02", Transport Area Working Group, Internet-Draft, Mar. 22, 2018.
Braden, R., et al., "Resource ReSerVation Protocol (RSVP)", RFC2205, Network Working Group, Request for Comments: 2205, Sep. 1997.
Fejes F., et al. "Who will Save the Internet from the Congestion Control Revolution?." Proceedings of the 2019 Workshop on Buffer Sizing. 2019.
Heinanen, J., et al., "Assured Forwarding PHB Group", Network Working Group, Request for Comments: 2597, Jun. 1999.
Nádas, S., et al., "A congestion control independent L4S scheduler", ANRW '20: Proceedings of the 2020 Applied Networking Research Workshop, Jul. 27, 2020.
Nádas, S., et al., "Towards a Congestion Control-Independent Core-Stateless AQM." Proceedings of the Applied Networking Research Workshop. 2018.
Nádas, S. et al., "Per packet value: A practical concept for network resource sharing", 2016 IEEE Global Communications Conference (GLOBECOM), Washington, DC, USA, 2016, pp. 1-7.

* cited by examiner

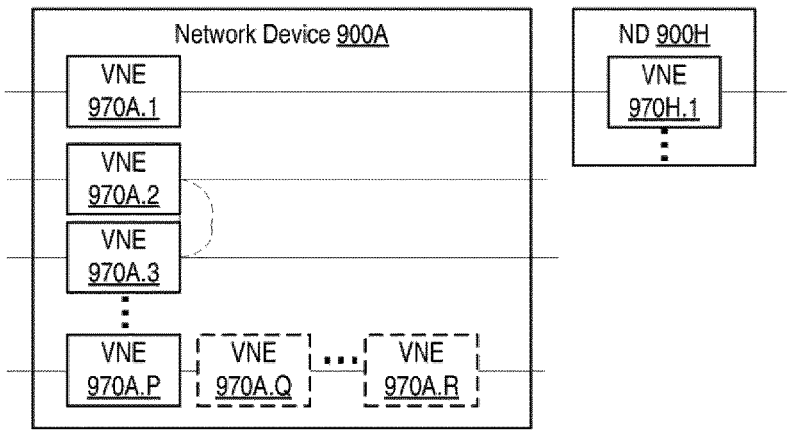
*FIG. 9C*
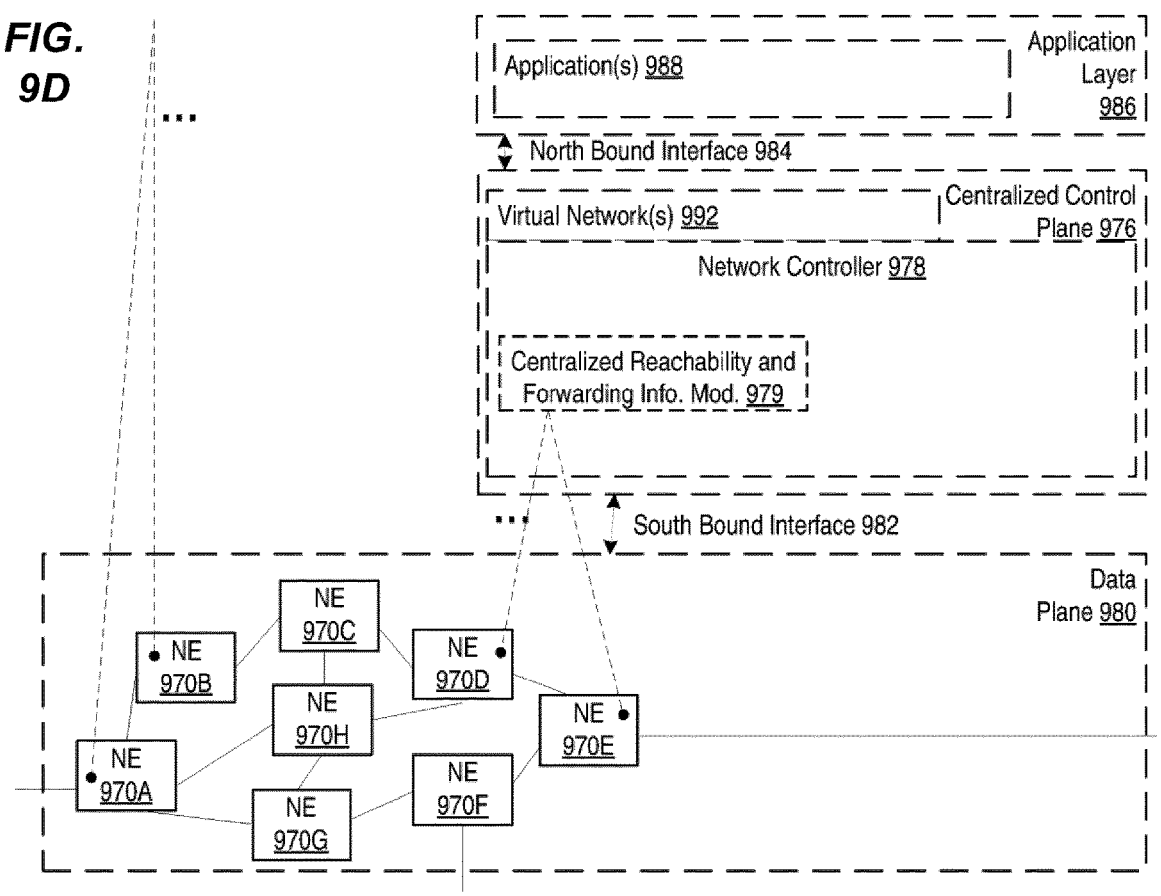
*FIG. 9D*
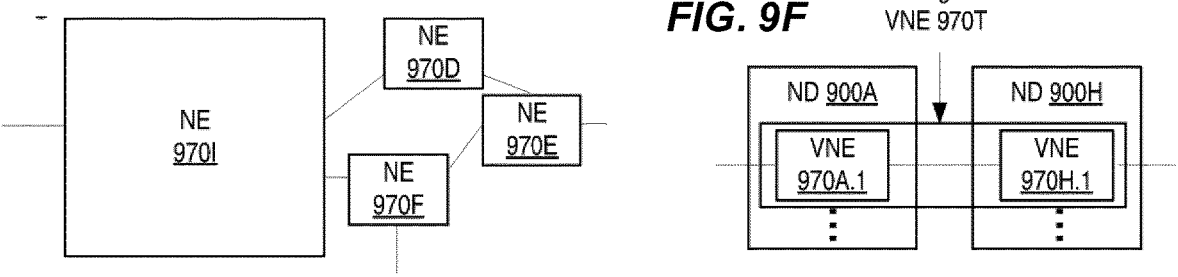
*FIG. 9E*
*FIG. 9F*

VIRTUAL DUAL QUEUE CORE STATELESS ACTIVE QUEUE MANAGEMENT (AQM) FOR COMMUNICATION NETWORKS

PRIORITY CLAIM

This application is a national stage of International Application No. PCT/EP2021/054377, filed Feb. 23, 2021, which claims the benefit of U.S. Provisional Application No. 63/014,918, filed on Apr. 24, 2020, the disclosures of which are all hereby incorporated by reference.

TECHNICAL FIELD

The present application relates generally to the field of communication networks and more specifically to techniques to improve active queue management (AQM) and congestion control (CC) for data traffic in communication networks.

BACKGROUND

In communication networks, various kinds of data traffic can be transferred. For example, this traffic can be carried via data packets over Internet Protocol (IP) and Transmission Control Protocol (TCP), as specified by the Internet Engineering Task Force (IETF). The various kinds of traffic may differ with respect to sensitivity towards delay of forwarding the data packets through the communication network. For example, for data packets associated with a file download, the delay of the data packets is typically not very relevant (e.g., a user merely waits slightly longer for the download). On the other hand, for data packets associated with real-time data transfers (e.g., multimedia streaming), lengthy delays may adversely impact the user experience because such data packets must be available at the receiver at a certain time, and late-arriving data packets are useless.

A known way of addressing varying delay requirements is to strictly prioritize delay-sensitive traffic over the other data traffic, while at the same time avoiding starvation of the other data traffic by limiting the delay-sensitive traffic to a maximum bitrate. In these techniques, however, the sharing of bandwidth within the communication network cannot be controlled in a satisfactory manner. For example, problems can occur in certain scenarios in which data traffic is not delay-sensitive but has high importance and, as such, should be treated with high priority.

Transport equipment in communication networks (also referred to as "communication nodes") usually has very limited packet processing and/or queuing capabilities, usually limited to a few priority or weighted fair queues, a few levels of packet drop precedence, etc. This can be driven by the need for high throughput and low transport cost per unit of data (e.g., packet). When data packet arrivals exceed the packet processing capability for a node, resulting in congestion, the node becomes a bottleneck and some packets are dropped due to the congestion.

The traditional congestion signal in TCP is the drop of packets. TCP increases its congestion window (and transmission rate) until available buffers overflow and packets are dropped. This behavior can cause an unacceptably large queuing latency. To overcome the congestion and improve both the throughput and latency of Internet applications based on TCP and other protocols, various Congestion Control (CC) and Active Queue Management (AQM) algorithms have been proposed. As the number of AQMs and CCs increases, however, it is more and more challenging to maintain compatibility, especially when certain AQMs assume specific CC behaviors.

At a high level, there are two common techniques for defining and signaling desired resource demands to a bottleneck in a communications network. The first technique is to pre-signal/pre-configure the desired resource sharing rules for a given traffic aggregate, such as a flow or a bearer, to the bottleneck node prior the arrival of the actual traffic. The bottleneck node then implements the handling of the traffic aggregates based on these sharing rules, e.g. uses scheduling to realize the desired resource sharing. An example of this technique is Resource Reservation Protocol (RSVP) specified in RFC2205. The second common way is to mark packets with drop precedence, which indicates the relative importance of the packets with respect to each other. In general, packets of higher drop precedence should be dropped before packets of lower drop precedence. An example of this technique is DiffServ Assured Forwarding (AF) within a given class, as specified in RFC2597.

Another variant of the second technique utilizes an Explicit Congestion Notification (ECN) congestion signal to control congestion. Instead of dropping packets at the bottlenecks during congestion, packets are marked as Congestion Encountered (CE or ECN-CE). End-to-end CC can be employed based on the ECN-CE markings of the packets. However, standard TCP reacts to ECN marks by cutting the congestion window in half. Without adequate buffering to keep a bottleneck link busy, this conservative back off can result in a severe loss of throughput.

This can be addressed by using Data Center TCP (DCTCP), which employs a fixed marking threshold at the switch queue and attempts to extract information about the extent of network congestion from the sequence of ECN marks in the packet acknowledgements (ACKs) from the receiver. A DCTCP source calculates the fraction of packets containing ECN marks within a given window of ACKs and reduces its window size in proportion to the fraction of marked packets. In this manner, congestion signals do not cause multiple flows to simultaneous back off and drastically lose throughput, as with standard TCP.

Active queue management (AQM) schemes try to proactively signal congestion before buffers overflow. Most of these mechanisms try to regulate a queue around some target occupancy. One exemplary AQM technique is PIE (Proportional Integral controller Enhanced), which was developed to address "bufferbloat"—a phenomenon where excess buffers in the network cause high latency and jitter. As more and more interactive applications (e.g. voice over IP, real time video conferencing, financial transactions, gaming, etc.) run via the Internet, high latency and jitter degrade application performance. PIE effectively controls the average queueing latency to a reference value. PIE assumes classical TCP CC and it determines packet drop/mark probability based on this assumption.

Another exemplary AQM technique is Per Packet Value (PPV), which provides a core-stateless way to control resource sharing among flows and, in some cases, can facilitate otherwise incompatible CCs to share the same bottleneck. In this technique, a communication node associates packets with a value related to resource sharing, e.g., by marking each packet with a value related to resource sharing in a physical network. The value (referred to as packet value or PV) on each packet indicates a level of importance of the packet relative to the importance of other packets being forwarded by the communication node. For example, the PV can indicate packet importance on a linear scale. In addition to providing bounded delays, PPV also allows throughput differentiation of different flows. It is based on packet drop, however, so it is not particularly compatible with CC based on ECN marking, such as DCTCP described above.

Another exemplary AQM technique is core stateless AQM (CSAQM), which can provide some compatibility between otherwise incompatible CC algorithms. For example, CSAQM can support ECN CE marking, with the only CC assumption being that when the CC marks ECN Capable Transport (ECT) on the packets, it keeps the ratio of ECN CE marked packets reasonable. In addition, CSQAM maintains the resource sharing properties of the PPV concept, while also supporting a wide range of flexible operator policies.

Even so, these and other CCs and AQMs have various problems, difficulties, and/or issues with respect to supporting a wide range of requirements typically encountered for data traffic in communication networks. For example, there is no solution that is ECN-capable (e.g., for compatibility with DCTCP), can support various delay requirements (including very low delays for certain flows), can enforce fairness and/or more refined resource sharing polices among flows, and can facilitate more general compatibility among varying CC algorithms.

SUMMARY

In an example of the present disclosure, there is provided a method for handling data packets by a communication node in a communication network, the method comprising:
storing received data packets in at least two physical queues, wherein a first of said at least two physical queues is associated with low latency data packets and a second of said at least two physical queues is associated with high latency data packets, wherein each data packet is stored in one of the at least two physical queues based on a delay characteristic associated with the data packet;
for each received data packet, storing an associated information record in at least two virtual queues, VQs, wherein associated information for data packets stored in said high latency physical queue is stored in a second of said at least two virtual queues and wherein associated information for data packets stored in said low latency physical queue is stored in both said first and second of said at least two virtual queues;
serving data packets from the at least two physical queues, using at least two Congestion Threshold Values, CTVs, wherein a first of said at least two CTVs is applicable to data packets in said low latency physical queue and wherein both said first and second of said at least two CTVs are applicable to data packets in said low latency physical queue and data packets in said high latency physical queue, wherein said at least two CTVs are used for at least one of dropping and marking packets based on their associated information.

Embodiments of the present disclosure provide specific improvements to various communication nodes in communication networks such as by facilitating solutions to overcome the exemplary problems summarized above and described in more detail below.

Exemplary embodiments include methods (e.g., procedures) for handling data packets by a communication node in a communication network. These exemplary methods can include storing received data packets in a first plurality of physical queues. Each data packet can be stored in a particular physical queue based on a delay characteristic associated with the particular data packet. These exemplary methods can include, for each received data packet, storing an associated information record in one or more of a first plurality of virtual queues (VQs). Each VQ can be associated with a particular physical queue. These exemplary methods can also include serving data packets from the physical queues, wherein serving the data packets comprises selectively marking data packets served from physical queues with an Explicit Congestion Notification (ECN) indicator based on respective congestion threshold values (CTVs) for one or more of the VQs.

In some embodiments, the first plurality of physical queues can include first and second physical queues, the first plurality of VQs includes first and second VQs, and the information record associated with each data packet can include a packet value (PV) and a packet length. In some of these embodiments, the PV can indicate a drop precedence associated with the received data packet. In some of these embodiments, the PV can be embedded within the received data packet.

In some embodiments, storing the associated information records can include, when storing a particular data packet in the first physical queue, storing the associated information record in both the first and second VQs; and, when storing a particular data packet in the second physical queue, store the associated information record only in the second VQ.

In some embodiments, the first physical queue can be associated with an ultra-low queueing latency, ultra-low loss, scalable throughput (L4S) service, and the second physical queue can be associated with a best-effort service. In some embodiments, the plurality of physical queues can be served according to a strict priority criterion whereby the first physical queue is served when it stores at least one data packet and the second physical queue is only served when the first physical queue stores no data packets. In some embodiments, each of the physical queues can be a first-in-first-out (FIFO) queue for received data packets, and each of the VQs can be a FIFO queue for the associated information records.

In some embodiments, the PV for each data packet can be any of a second plurality of values. In such embodiments, these exemplary methods can also include, for each VQ, maintaining a data structure that relates each particular value, of the second plurality, to a total of packet lengths, associated with the particular value, contained in information records currently stored in the VQ. In some embodiments, the data structure can be a histogram.

In some of these embodiments, these exemplary methods can also include, upon serving a data packet having a particular PV and a particular length from a particular physical queue, removing the data packet from the particular physical queue and removing information from all VQs. The information removed from each VQ can correspond to a size less than or equal to the particular length of the data packet. In some embodiments, the removed information can correspond to information records associated with one or more received data packets having respective one or more PVs. In some embodiments, for each VQ, the size of the removed information can be determined based on a ratio between a serving rate of the VQ and a bottleneck rate for serving the physical queues.

In some embodiments, the exemplary method can also include, based on removing the information from all VQs, updating the data structures for each VQ by reducing the total packet lengths associated with the one or more PVs according to the size of information removed (from the VQ) for each of the PVs.

In some embodiments, selectively marking the data packets can include, when a data packet is served from the first physical queue, marking the data packet with an ECN indicator when the PV associated with the served data packet is less than the CTVs for both the first and second VQs. In some embodiments, selectively marking the data packets can include, when a data packet is served from the second physical queue, marking the data packet with an ECN indicator when the PV associated with the data packet is less than the CTV for the second VQ. In some embodiments, selectively marking the data packets can include, based on an indication that the data packet being served from a physical queue is not associated with ECN capable transport (ECT), refraining from marking the data packet and dropping the data packet.

In some embodiments, the VQs can be configured with respective delay targets, serving rates, and maximum lengths. In such embodiments, the serving rate for the first VQ is not greater than the serving rate for the second VQ. In some of these embodiments, these exemplary methods can also include, for each VQ, determining the CTV based on the serving rate and the delay target configured for the VQ, and based on the current length of the VQ. In some embodiments, determining the CTV can include determining whether a CTV timer has expired and, upon determining that the CTV timer has expired, determining the CTVs for the respective VQs and reinitializing the CTV timer.

In some embodiments, determining the CTV for each VQ can also include determining a VQ length threshold based on the VQ's serving rate and delay target and, when the current length of the VQ is not greater than the VQ length threshold, setting the CTV to zero. In some embodiments, determining the CTV for each VQ can also include, when the current length of the VQ is greater than the VQ length threshold, determining the CTV based on a data structure that relates each PV, of a plurality of PVs, to a total of the packet lengths, associated with the PV, contained in information records currently stored in the VQ. The data structure can be the maintained data structure, discussed above. In some embodiments, determining the CTV for each VQ based on the data structure can include various operations, described in detail herein.

Other exemplary embodiments include communication nodes (e.g., switches, routers, base stations, etc.) in a communication network (e.g., packet data network, transport network, core network, radio access network, etc.), that are configured to perform operations (e.g., using processing circuitry) corresponding to any of the exemplary methods described herein.

Other exemplary embodiments include non-transitory, computer-readable media storing computer-executable instructions that, when executed by processing circuitry associated with such communication nodes, configure the same to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes

FIG. 9, which includes FIGS. 9A-9F, illustrates various aspects network devices or communication nodes, according to various exemplary embodiments of the present disclosure.

DETAILED DESCRIPTION

Figure 1:
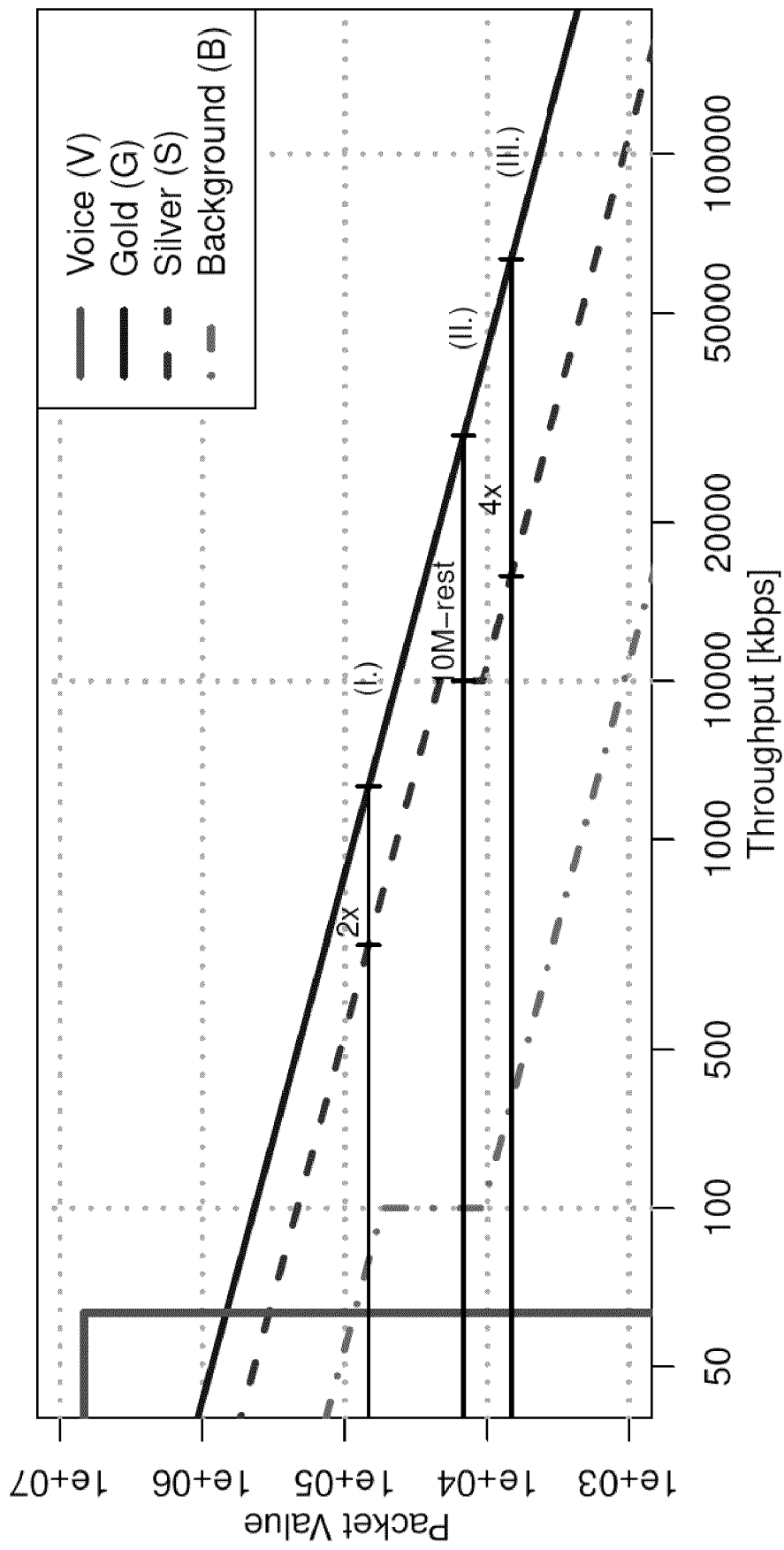
FIG. 1 shows different operator policies expressed as throughput value functions (TVFs) that describe conditional weighted resource sharing between three traffic classes.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms may be used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Communication Node: As used herein, a "communication node" is any node is any node in a communication network, including but not limited to network nodes of a core network or a radio access network, as described above. In addition, a communication node can be a node in a packet data network, a transport network, or other type of wide area network (e.g., the Internet) that is coupled or connected to another communication network that provides access (directly or indirectly) to users (e.g., a wireless communication network comprising a core network and a radio access network, as discussed above). Functionally, a communication node is equipment capable, configured, arranged, and/or operable to communicate data packets directly or indirectly with other communication nodes or equipment in the same and/or other communication networks, including receiving, queuing, routing, and/or transmitting such data packets.

Traffic flow: As used herein, a traffic flow (also referred to as a "data flow" or, more simply, a "flow") is a group or collection of packets identified by a set of header information and port information including, but not limited to: IP header, Layer 2 (L2) header, virtual and/or physical interface port, and/or agent circuit ID information for a remote port in an access network. A data flow may be identified by a set of attributes embedded to one or more packets of the flow. An exemplary set of attributes includes a 5-tuple (source and destination IP addresses, a protocol type, source and destination TCP/UDP ports).

Packet value: As used herein, a "packet value" (or PV) is a value assigned to each of a plurality of data packets (e.g., of one or more flows) and is also referred to as a per packet value (PPV). A PV is a scalar value and enables nodes to perform computations on these values, such as summing up the values for a total value or dividing the values to reflect higher cost of transmission. The packet values can not only express which packet is more important, but also by how much. The range of PVs available to be used can be continuous (e.g., positive real values) or discrete (e.g., positive integers). In some embodiments, a whole packet has the same PV, but the representation of the PV may be a value of a single bit of that packet. In one embodiment, the PV indicates a drop precedence of a packet. The PV marked for a packet may be the value of the single bit times bit length. The coding of the value may be linear, logarithmic or based on a mapping table. In other words, the PV for a packet may be embedded within the packet, but it also may be indicated outside of the packet (e.g., a mapping table within a network device to map packets of one traffic flow to one packet value). While packets of a single traffic flow may share the same PV in some cases, they may have different packet values in other cases (e.g., packets of a video traffic flow may assign different packet values to different layers of the video traffic flow).

As briefly mentioned above, various existing congestion control (CC) and active queue management (AQM) algorithms have various problems, difficulties, and/or issues with respect to supporting a wide range of requirements typically encountered for data traffic in communication networks. For example, there is no solution that is ECN-capable (e.g., for compatibility with DCTCP), can support various delay requirements (including very low delays for certain flows), can enforce fairness and/or more refined resource sharing polices among flows, and can facilitate more general compatibility among varying CC algorithms). This discussed in more detail below.

As briefly mentioned above, the PPV concept extends the idea of core stateless resource sharing solutions by marking each packet with a continuous PV. Conceptually, PV should represent the gain of the operator when a packet is delivered. The total value of a longer packet is higher than a shorter one with the same PV marking, but normally it also takes proportionally more resources to deliver the longer packet. The aim of a communication network, and every communication node within a network, is to maximize the total aggregate PV of the packets transmitted. This can include value to the network operator, and also the value to the user of the network. In addition, it also allows the network operator to incorporate its own preferences, by giving higher PV to more important users or traffic, such as emergency services.

A system model of PPV can be split into two phases: 1) PV marking at network edge; and 2) packet scheduling and dropping at communication nodes in middle based on the marked PVs. First, packets are marked at the edge of the network by using a resource sharing policy of the operator. Operator policies are described by Throughput-Value Functions (TVFs) (e.g., V(.)) that basically define the PV distribution of a flow for any sending rate. Specifically, for any throughput value b, the traffic up to b shall receive a PV of V(b) or higher. Accordingly, at high congestion only packets with high PVs are transmitted, more precisely packets with PV above a given Congestion Threshold Value (CTV). Packets with PVs below the CTV are delayed or dropped. Note that the amount of high and low PV packets determines the resource share between various flows, resulting in that at high congestion, flows with larger share of high PV packets receive more throughput.

CTV is a momentary emergent value resulting from the combination of available capacity, amount of offered traffic, and the PV composition of the offered traffic. As congestion increases, CTV also increases as only more and more important packets make it through the available capacity. As congestion eases, CTV also decreases as packets with lower PVs can get transmitted. Communication nodes may also take care to preserve packet ordering within a flow, when needed.

FIG. 1 shows different operator policies expressed as total value functions (TVFs) that describe conditional weighted resource sharing between three traffic classes—Gold, Silver, and Background—while Voice traffic has strict priority up to 64 kbps. The intersection of the TVFs with the solid horizontal lines (representing different congestion levels or CTVs) defines the desired throughput of the classes at each CTV. In the exemplary arrangement, until Silver flows reach 10 Mbps, Gold flows get twice the throughput of Silver ones When the throughput of Silver flows is above 10 Mbps, Gold flows get four times the throughput In between those points, Silver policy behaves as a rate limiter at 10 Mbps and Gold flows get the remaining capacity, which will be between 20 and 40 Mbps. The Background traffic class retains a small share of moderate PV to keep connectivity alive but receives larger bandwidth only if there is little or no congestion.

Communications nodes in the middle of the network treat packets without maintaining flow-states, solely relying on the carried PVs. Each such node aims at maximizing the total amount of value transmitted over the shared bottleneck. The simplest PV-based scheduling algorithms drop the packet with the smallest PV (even from the middle of the buffer) when the buffer length is too long. Other more complex scheduling algorithms (referred to as PVPIE) use a controller to determine the drop probability from the current and target queuing delay values. However, instead of applying packet drops uniformly at random, the calculated probability is transformed to a CTV by taking the empirical probability distribution of PVs carried by the packets observed in a given time frame. Then all the packets with PV less than this CTV are dropped, resulting in the expected drop probability and resource sharing in stable periods.

Core-Stateless AQM (CSAQM) algorithms, briefly mentioned above, typically mark/drop packets at the head of a single first-in/first-out (FIFO) queue based on a maintained CTV. This behavior does not require any flow classification, but still results in different empirical mark/drop probabilities for different CC algorithms. Furthermore, CSAQM can implement more complex resource sharing policies than simple equal sharing, since it utilizes the resource sharing principles of PPV without the need for a complex controller, such as PVPIE.

Figure 2:
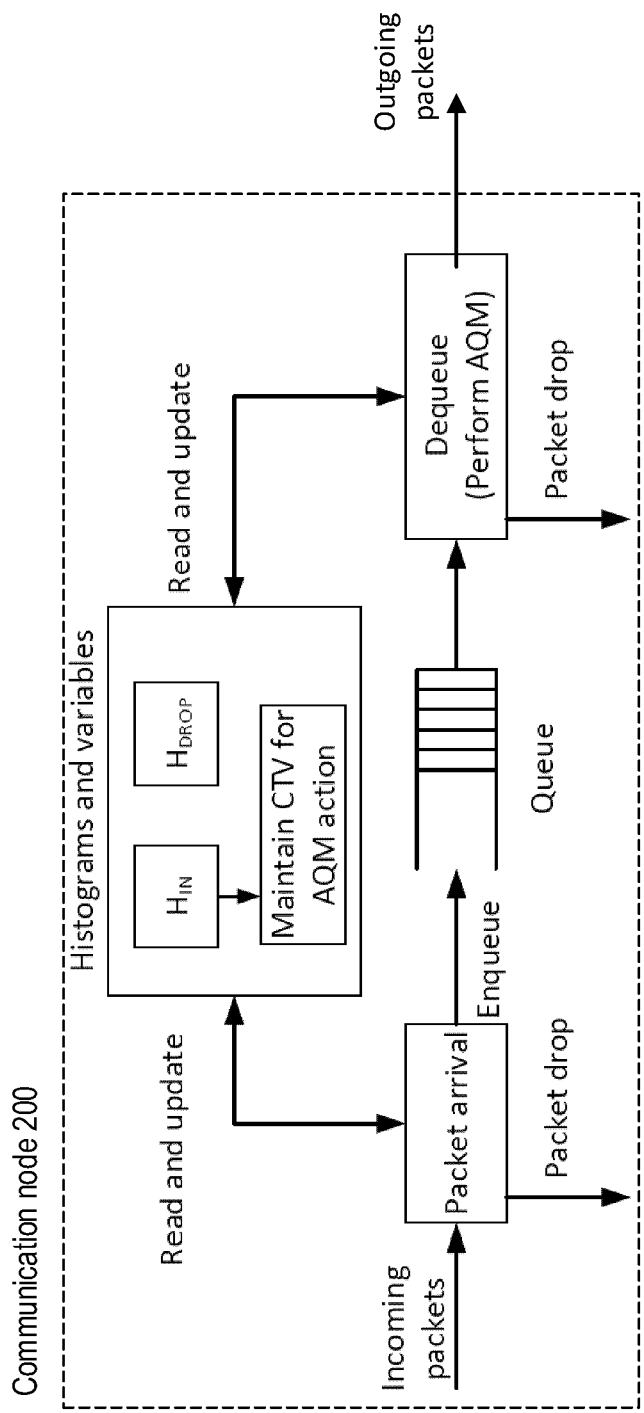
FIG. 2 shows an exemplary architecture of a communication node comprising a packet scheduler based on core stateless active queue management (CSAQM) principles.

FIG. 2 shows an exemplary architecture of a communication node 200 comprising a packet scheduler based on CSAQM principles. The operation of the packet scheduler is described as follows.

At Packet Arrival, the packet scheduler first decides whether an incoming packet is queued or dropped, based on the maximum queue length and the PV composition in the histogram HIN, which maintains the total number of packet bits in the queue for all possible PVs. If the queue is full, packets already in the buffer with smaller PV than the one of incoming packet needs to be dropped to make space, if possible. Marking these packets as dropped can be done by moving bits from histogram $H_{IN}$ to a drop histogram $H_{DROP}$ that represents packets to be dropped at dequeue phase. In the normal case when all flows are responsive and the maximum size of the buffer is reasonable, packet drop is not triggered by packet arrival and packet ECN-marking (and dropping) only happens at dequeue, based on the CTV.

At Dequeue phase, CSAQM first drops packets based on $H_{DROP}$, then based on the maintained CTV it decides whether to mark/drop on the outgoing packet. CTV is updated periodically based on a queue length threshold and $H_{IN}$. If the current queue size is below the queue length threshold, all the packets are sent out without any modification (i.e., no ECN marking/dropping).

For example, PV can be logarithmically encoded to two octets (i.e., 16 bits length) according to:

$$v=\lfloor \log(PV)/\log(PV\max) \times 65535 \rfloor, \qquad (1)$$

where v denotes the unsigned integer representing the coded PV, $\lfloor . \rfloor$ represents the floor operation (i.e., next lowest integer), and PV=0 is coded to v=0. The bottleneck capacity is C, the maximum allowed queuing delay is Dmax, and the queueing delay threshold is D. Let p be the packet arrived; v its coded PV and ps its size in bits. The actual queue length q can be determined according to:

$$q=\Sigma_i H_{IN}(i). \qquad (2)$$

and the free space in the queue can be calculated according to s=c Dmax−q.

Upon packet arrival, if there is enough free space in the queue (i.e., s≥ps), the packet is inserted to the end of the queue and $H_{IN}$ is updated according to $H_{IN}(v)$+=ps. If there is not enough room to store p in the queue (i.e., s<ps), CSAQM marks for dropping ps−s bits of the smallest coded PVs (w where w<v) until either s=ps or all $H_{IN}(w)$=0, where w=0 . . . v−1, in which case no more can be dropped. If successful, p is enqueued and $H_{IN}$ is updated according to $H_{IN}(v)$+=ps). If unsuccessful, the arrived packet is dropped. When maximum b bits of coded PV v is to be dropped from the queue, it is checked whether $H_{IN}(v)$>0 and if so, d=min ($H_{IN}(v)$, b) bits are marked for dropping by $H_{DROP}(v)$+=d and $H_{IN}(v)$−=d.

Dequeuing is initiated by the bottleneck node. The first packet p is dropped until $H_{DROP}(v)$=0. When packet p is dropped, it is removed from the queue and $H_{DROP}$ is updated according to $H_{DROP}(v)$−=ps. If $H_{DROP}(v)$<0, the histograms are updated according to $H_{IN}(v)$+=$H_{DROP}(v)$ and $H_{DROP}(v)$ =0. After that the head packet p is removed from the queue and $H_{IN}$ is updated according to $H_{IN}(v)$−=ps.

CSAQM then checks whether head packet p is to be acted upon by the AQM, by checking whether v<ctv. If not, then the packet is transmitted unchanged. If it is, then the packet is marked as ECN CE (if ECT) or dropped (if not ECT). Upon packet drop by the AQM, the dequeue process until either a packet is transmitted, or the queue becomes empty (e.g., from dropping all queued packets).

Figure 3:
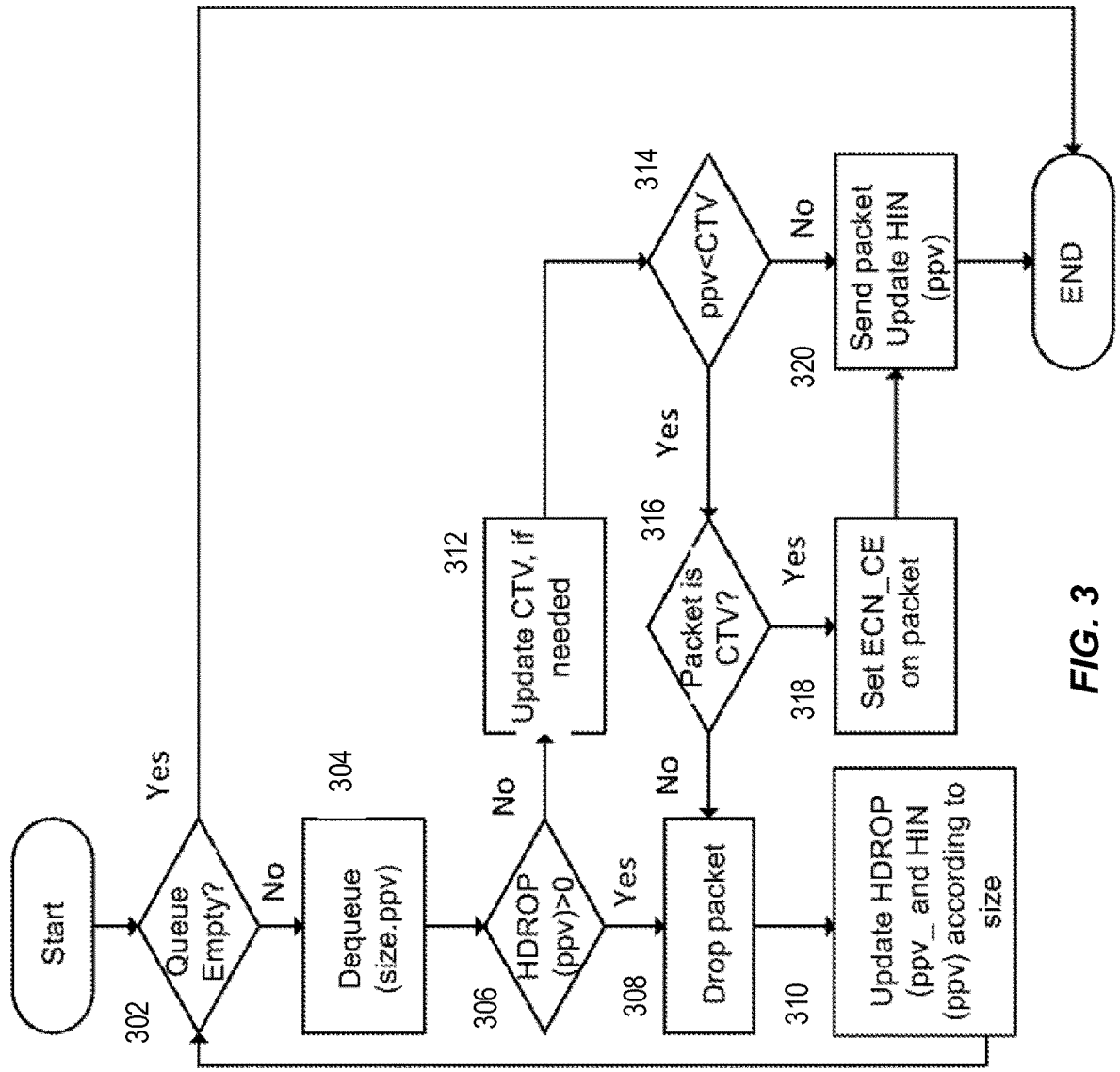
FIG. 3 is a flow diagram illustrating an exemplary packet dequeue process.

FIG. 3 is a flow diagram illustrating an exemplary packet dequeue process, in accordance with the above description. The exemplary process can be performed by a communication node, such as communication node 200 shown in and described in relation to FIG. 2 above. Although FIG. 3 shows operations with numerical labels, these labels are merely intended to facilitate explanation and neither require nor imply that the operations are performed in the numerical order, unless expressly stated otherwise.

In operation 302, it is determined that the queue is not empty. At operation 304, the dequeue size, PPV is determined. At operation 304, a packet to be served is exiting from queue. The packet has a size and a PPV. At operation 306, the node determines whether the PPV of the packet has any accumulated byte length in a packet-drop histogram such as $H_{DROP}$. If there is any byte associated with the PV in $H_{DR}OP$ as determined at operation 306, the flow goes to operation 308 and the packet is dropped without being served.

At operation 310, histograms $H_{IN}$ and $H_{DROP}$ can be updated. For example, the communication node may remove bytes corresponding to the packet from the $H_{DROP}$ histogram. In some cases, a packet has a portion of bytes that are tracked in $H_{DROP}$, and the remaining portion of the packet are tracked in $H_{IN}$. Thus, in a particular embodiment, the communication node can also remove the remaining portion of the packet in the $H_{IN}$ histogram, since it is unlikely the remaining portion of the packet will be served properly. In this embodiment, the $H_{IN}$ histogram needs to be updated once the remaining portion of the packet is removed (e.g. reducing the byte length for the corresponding packet value by the number of bytes removed). The flow goes back to operation 302, and the communication node determines whether another packet is exiting from the queue.

Returning to operation 306, if there is no byte associated with the PPV in $H_{DR}OP$ and the packet is not dropped due to the PPV being present in $H_{DROP}$, the flow goes to operation 312 where the CTV is updated, if needed. The updating of the CTV is described in more detail below. Thereafter, a determination is made at operation 314 of whether the PPV of the packet is less than CTV. If it is determined that the PPV of the packet is less than CTV, then a determination is made at operation 316 as to whether the packet is ECT. If it is determined that the packet is ECT capable (by examining the incoming IP ECT field), then the packet is ECN marked by setting ECN CE in operation 318. The packet is then transmitted in operation 320 and $H_{IN}$ is updated.

On the other hand, if it is determined at operation 316 that the packet is not ECT, then operation returns to 308 and the packet is dropped. In this manner, the dequeue mechanism maintains $H_{IN}$ and $H_{DROP}$ as described above.

As mentioned above, the CTV also must be maintained according to composition of packets being transmitted. Upon every packet dequeue, it is checked whether CTV has been updated during the last Tupdate,ctv. If not, CTV is re-evaluated as follows. The queue length threshold is calculated as $l=C \cdot D$. If the actual queue length is smaller than or equal to the threshold (i.e., $q \leq l$), CTV is set to 0. Otherwise, starting from the maximum coded PV (i.e., Vmax=65535) and proceeding through progressively lower coded PV(v), the bits of $H_{IN}$ are accumulated until reaching queue length threshold l. The smallest v where/is not exceeded determines CTV according to:

$$ctv = \mathrm{argmin}_v \Sigma_{i=v}^{Vmax} H_{IN}(i) \leq l. \qquad (3)$$

Figure 4:
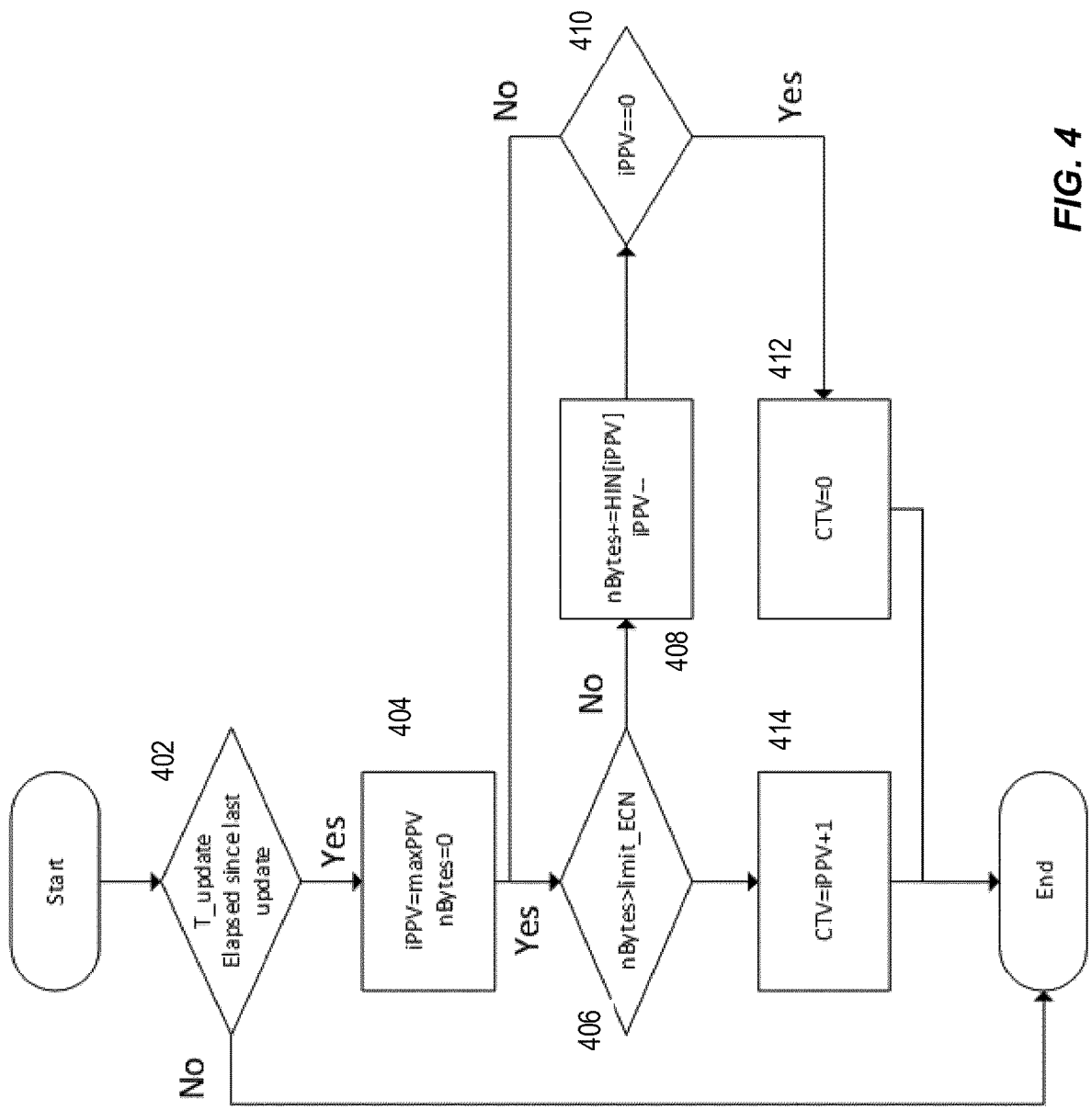
FIG. 4 is a flow diagram illustrating an exemplary process for updating Congestion Threshold Values (CTVs), according to various exemplary embodiments of the present disclosure.

FIG. 4 is a flow diagram illustrating an exemplary process for updating CTV, in accordance with the above description. According to some embodiments, the exemplary process shown in FIG. 4 can be viewed as illustrating operation 312 of FIG. 3 in more detail. The exemplary process can be performed by a communication node, such as communication node 200 shown in and described in relation to FIG. 2 above. Although FIG. 4 shows operations with numerical labels, these labels are merely intended to facilitate explanation and neither require nor imply that the operations are performed in the numerical order, unless expressly stated otherwise.

Operation 402 includes a determination as to whether Tupdate,ctv has elapsed since the last update. If Tupdate,ctv has not lapsed since the last update, operation ends. However, if Tupdate,ctv has lapsed since the last update, the number of bytes is summarized from the highest PPV s until either all bytes are counted (iPPV==0) or the limit ECN is reached, at operations 404-410. The CTV is determined based on this at operation 412 or 414, such as specified by equation (3), above.

Achieving the lowest level of queueing latency imposes a fundamental tradeoff with bandwidth, particularly the need for creating a "bandwidth headroom". One technique for creating bandwidth headroom is a simulated queue (also referred to as "phantom queue", PQ, or "virtual queue", VQ) associated with each switch egress port, that sets ECN marks based on link utilization rather than queue occupancy. The PQ simulates queue buildup for a virtual egress link of a configurable speed that is slower than the actual physical link (e.g., running at g=95% of capacity). A PQ attempts to set aggregate transmission rates for congestion-controlled flows to be strictly less than the physical link capacity, thereby keeping switch buffers largely unoccupied. The resulting bandwidth headroom allows latency sensitive flows to pass through the network with minimal buffering latency.

Even so, conventional arrangements of coupled physical and virtual queues are targeted at scenarios where all traffic is low-delay and do not address scenarios involving traffic having a wider range of delay requirements (e.g., some low-delay, some best-effort). Furthermore, such conventional arrangements do not support PV-marked data packets. Similarly, conventional CSAQM arrangements discussed above may also struggle to support traffic with a wider range of delay requirements due to utilizing a single physical queue. Furthermore, such conventional techniques can have difficulties with enforcing fairness and/or other resource sharing policies among different flows, as measured according to known metrics.

Exemplary embodiments of the present disclosure address these and other problems, issues, and/or difficulties by providing a coupled physical queue-virtual queue scheduling system (e.g., for a communication node), in which the physical queues can utilize strict priority scheduling and the virtual queues (VQs) can take into account the scheduling of the physical queues. In various embodiments, the scheduling system can utilize packet values (PVs) marked on incoming data packets, and can mark outgoing data packets with ECN indicators according to determinations made by the scheduling system. In particular, the ECN marking determinations are made based on the VQs rather than the physical queues. In some embodiments, ECN marking determinations for the data packets served from the physical queues can be made based on Congestion Threshold Values (CTVs) determined from the VQs.

In various embodiments, the VQs can contain packet-associated information (i.e., rather than the actual packets, such as PVs and packet lengths. In some embodiments, packet information for certain types of packets (e.g., L4S) can be stored in multiple VQs simultaneously, while packet information for other types of packets (e.g., BE) can be stored in a single VQ that is associated with that type of packet.

Embodiments of the present disclosure can provide various benefits and/or advantages. For example, embodiments can be implemented with relatively low complexity on programmable packet switches. In addition, embodiments are based on the well-developed PPV framework, so they retain all the advantages of that framework in relation to PV marking. In addition, embodiments can simultaneously support a wide range of features and/or requirements, including ECN, varying delay requirements including ultra-low delay for certain flows, fairness among flows and other resource sharing principles, and compatibility with multiple CC algorithms.

At a high level, various embodiments can include two physical queues, e.g., a low-delay queue and a higher-delay queue, which can be served using a strict priority scheduler. Such embodiments also include two VQs, e.g. a low-delay VQ and a higher-delay VQ. The information of the packets (e.g., packets values and packet lengths) arriving to the low-delay queue is stored in the low delay VQ, and information of packets arriving to both physical queues are stored in the higher-delay VQ. In general, the VQs are served with a slightly smaller throughput than the physical output capacity, C. Based on the state of a virtual queue (including packet values and packet lengths within) and a target delay, a congestion threshold value (CTV) can be calculated for a particular VQ. The CTV of the low-delay VQ can be used as a marking threshold for packets leaving the low-delay physical queue. The CTV of the higher-delay VQ can be used as a marking threshold for packets leaving either of the physical queues.

Figure 5:
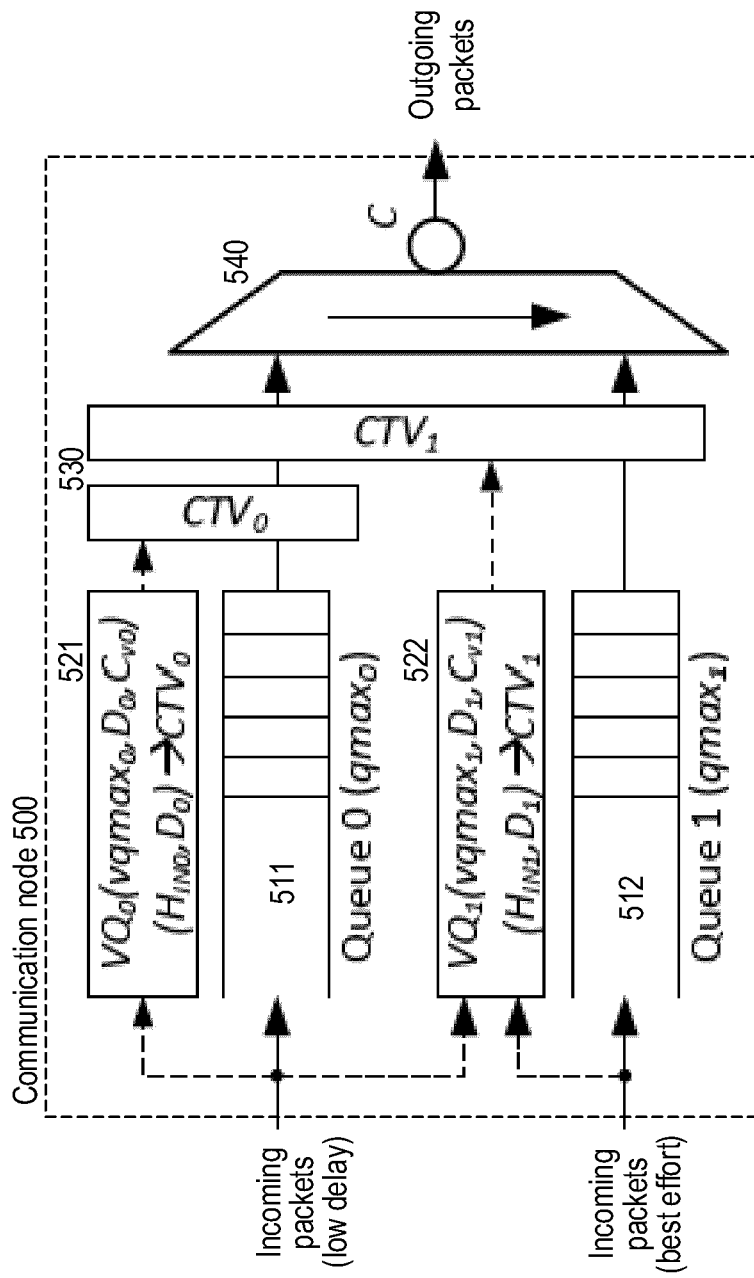
FIG. 5 depicts a communication node according to various exemplary embodiments of the present disclosure.

FIG. 5 depicts a communication node 500 according to various exemplary embodiments of the present disclosure. Node 500 includes two physical queues, Queue0 (511) for incoming traffic with low delay requirements and Queue1 (512) for higher-delay/best-effort (BE) incoming traffic. In some embodiments, Queue1 can be arranged to provide ultra-low queueing latency, ultra-low loss, and scalable throughput—also referred to as "L4S". In general, L4S service traffic can be isolated from the queuing latency of a best-effort traffic service such as Queue0, also referred to as "classic TCP" or "classic". However, the L4S-compatible Queue0 and the Classic/BE Queue1 should be able to freely share the common pool of capacity, since there is generally no reliable way to predict how many flows of each type will be present at any given time. The arrangement of physical queues shown in FIG. 5 can be considered a dual queue coupled AQM. The two physical queues can be arranged as FIFO buffers with respective current lengths qlen0, qlen1 and respective maximum lengths qmax0, qmax1.

In contrast to conventional dual queue coupled AQMs, node 500 also includes two virtual queues, VQ0 (521) associated with Queue0 and VQ1 (522) associated with Queue1. In FIG. 5, data packet paths and information paths are illustrated by solid and dashed lines, respectively. Low-delay (e.g., L4S) data packets arrive to Queue0, while information about these packets are put into both VQs. High-delay (BE) data packets arrive to Queue1, and information about these packets is put into VQ1 only. In some embodiments, each VQi (i=0,1) stores (PV, packet-length) pairs for respective data packets stored in the associated physical queue (e.g., Queue0 associated with VQ0). As an example, a packet having PV(v) and packet length ps will have (v, ps) information stored in one or more of the VQs. This information can be stored in a FIFO buffer, similar to how the data packets are stored in physical queues.

Each VQi can have current length vqleni and can also be configured with the following parameters:
vqmaxi, the maximum length of VQi;
Di, the delay target of VQi; and
Cvi, the serving rate of VQi, where Cvi≤C and Cv0≤Cv1.
  Preferably, each VQ has a slightly smaller serving rate than the physical bottleneck rate C, e.g., Cv0=63/64·C, Cv1=127/128·C.

Each VQi also maintains a histogram $H_{IN}i(v)$, v=0 ... Vmax, that counts bytes of data packets labelled with PV=v that are currently in the associated physical queue. For example, each VQ histogram $H_{IN}i(v)$ can be maintained in the same or a similar manner as described above with respect to the histogram $H_{IN}$ for the physical queue of FIG. 2.

When a packet of length ps (e.g., in bytes) and assigned PV arrives to Queuei, it is placed (or enqueued) in Queuei if qleni+ps≤qmaxi and vqlenj+ps≤vqmaxj, for all j≥I; otherwise the packet is dropped. For example, if an L4S data packet arrives at Queue0, it is placed in Queue0 only if qlen0+ps≤qmax0, vqlen0+ps≤vqmax0, and vqlen1+ps≤vqmax1. In the normal case when all flows are responsive and the maximum size of the buffer is reasonable, packet drop is not triggered by packet arrival but by packet ECN-marking/dropping at dequeue based on the CTVs, discussed below. When packet information (v, ps) is added to VQi, its state is updated according to vqleni+=ps and $H_{IN}i(v)$+=ps.

Each VQ periodically calculates its own CTV based on current state, such as in the manner described below. PVs for data packets leaving Queue0 are compared to both CTV0 and CTV1 to decide whether to mark each packet as ECN CE. The operations performed by the comparator circuit (530) are explained as follows. For a packet leaving Queue0, if PV<min(CTV0, CTV1), the packet will be marked with ECN CE; otherwise it will not be marked. On the other hand, for a packet leaving Queue1, the packet will be marked ECN CE if PV<CTV1; otherwise it will not be marked. The queues are served by a strict priority scheduler (540) for a system capacity C, whereby Queue0 has the higher priority of the two. In other words, the scheduler serves Queue0 so long as it is not empty, while Queue1 is only served when Queue0 is empty.

Note that even if the PV of a packet leaving Queue0 (or Queue1) meets the relevant criterion, it will only be marked ECN-CE when a CC algorithm has labeled the packet as ECN Capable Transport (ECT). If a packet not labelled as ECT meets the relevant criterion, it will be dropped instead.

Packet information is continuously removed from VQi according to the Cvi serving rate, even when the physical queues are empty. When a packet of size ps bytes is served from any one physical queue (e.g., Queue0 or Queue1), packet information corresponding to exactly psvi=ps*Cvi/C bytes are removed from each VQi, i=0,1. If vqleni<psvi, then only vqleni bytes are removed. Since CVi/C can be less than 1, information corresponding to a fraction of a single packet may need to be removed or information corresponding to more than a single packet may need to be removed. When fractional packet information for a packet with PV(v') is removed, this packet information is updated to a reduced size, e.g., (v', ps-psvi), rather than being removed completely. This modified packet information will remain at the head of VQi, to be removed when the next packet is served from Queue0 or Queue1.

In addition, each VQi state is updated according to $H_{IN}i(v')$-=ps' and vqleni-=ps', where v' is the PV of the record removed from VQi or reduced in size within VQi, and ps' is the size of the record removed or reduced. In case ps' is split across multiple records with different PV (e.g., v'1 and v'2), the histogram is updated according to the size removed/reduced for each of the different PVs (e.g., $H_{IN}i$(v'1), $H_{IN}i$(v'2)).

Each VQi calculates a CTVi periodically, e.g., every 5 ms. The VQ-specific CTVi can be calculated in a similar manner as described above, e.g., in equation (3). For example, the VQ length threshold can be calculated as li=Cvi·Di. If the length of the actual queue, qleni, is less than or equal to the length threshold li of the associated VQ, CTVi is set to 0. Otherwise, starting from the maximum coded PV (i.e., Vmax) and proceeding through progressively lower coded PV(v), the bits of $H_{IN}i$ are accumulated until reaching queue length threshold li. The smallest v where li is not exceeded determines CTVi according to equation (4) below. This procedure can also be represented by the flow diagram of FIG. 4, described above.

$$CTV_i = \operatorname{argmin}_v \Sigma_{j=v}^{Vmax} H_{IN} i(j) \le l_i. \quad (4)$$

Figure 6:
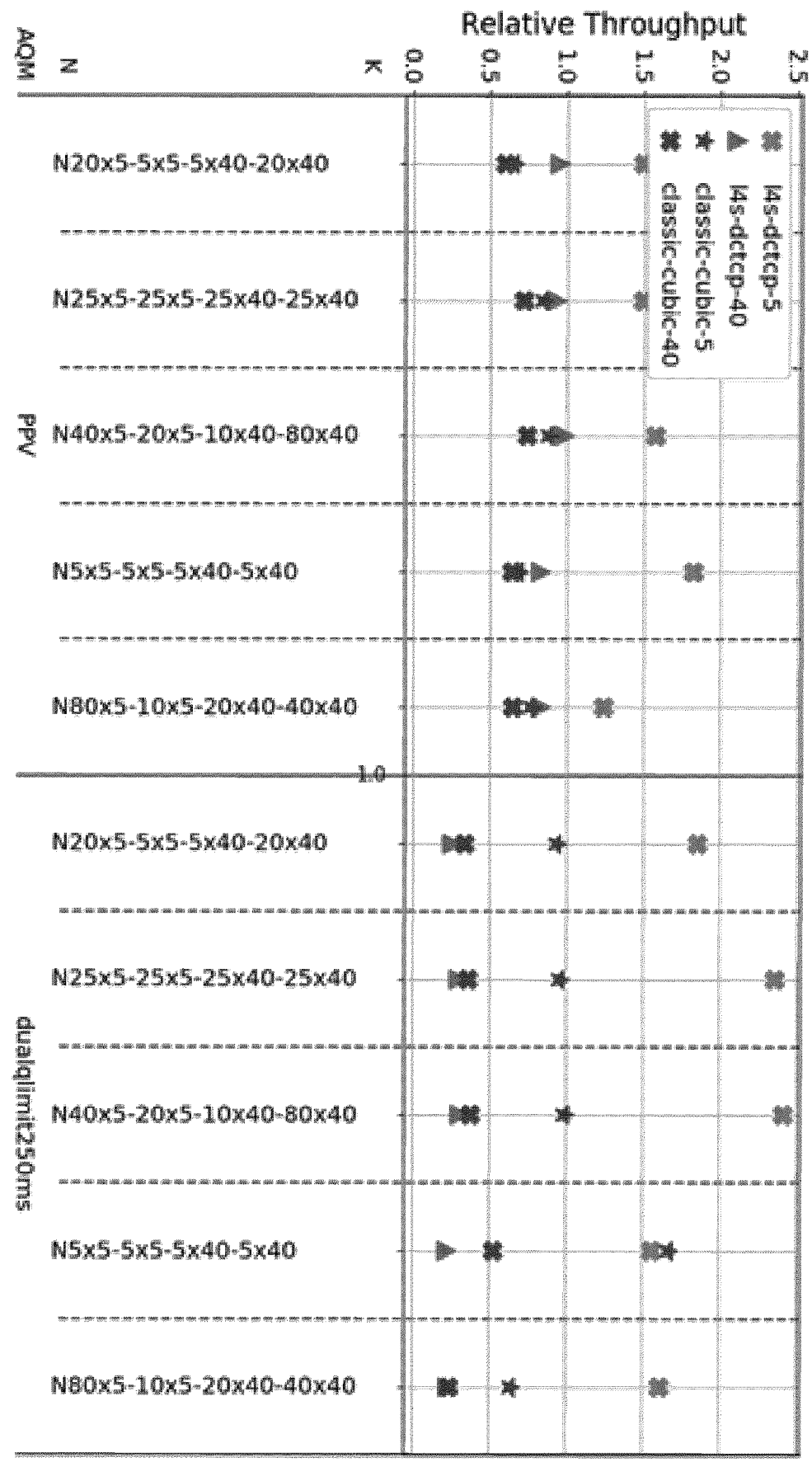
FIGS. 6-7 are graphs illustrated exemplary performance characteristics of various embodiments of the present disclosure.

FIG. 6 shows exemplary performance graphs of various embodiments of the scheduler disclosed herein. In FIG. 6, the exemplary embodiments are labelled "PPV" and are compared to a reference DualQ-PI2 scheduler, which is labelled "dualqlimit250 ms". In particular, FIG. 6 depicts the Relative Throughput per connection class. A connection class of a flow is determined based on the queue used (Queue0=I4s, Queue1=classic), the congestion control algorithm used (DCTCP or Cubic), and the end-to-end round trip time (RTT, e.g., 5 ms or 40 ms). Relative throughput is defined as the ratio of the average throughput within a connection class to the ideal per-connection fair-share, which is the bottleneck capacity per the total number of TCP connections. For example, relative throughput of 1.0 means that the connections of a particular class experience the fair-share of the total capacity for that class, on average. In general, a relative throughput of 1.0 is desirable behavior.

In addition, N indicates the number of flows from each class. Performance for various combinations of the parameters are labelled such as N40×5-20×5-10×40-80×40, which indicates 40 classic-cubic-40 ms, 20 I4s-dctcp-40 ms, 10 classic-cubic-5 ms, and 80 I4s-dctcp-5 ms flows. The order of connection classes remains the same. When looking at FIG. 6, it is apparent that the exemplary embodiments labelled "PPV" have relative throughputs for the various combinations of flows that are grouped more closely around the desirable 1.0 value than the relative throughputs for the same combinations based on the reference L4S method labelled "dualqlimit250 ms".

Figure 7:
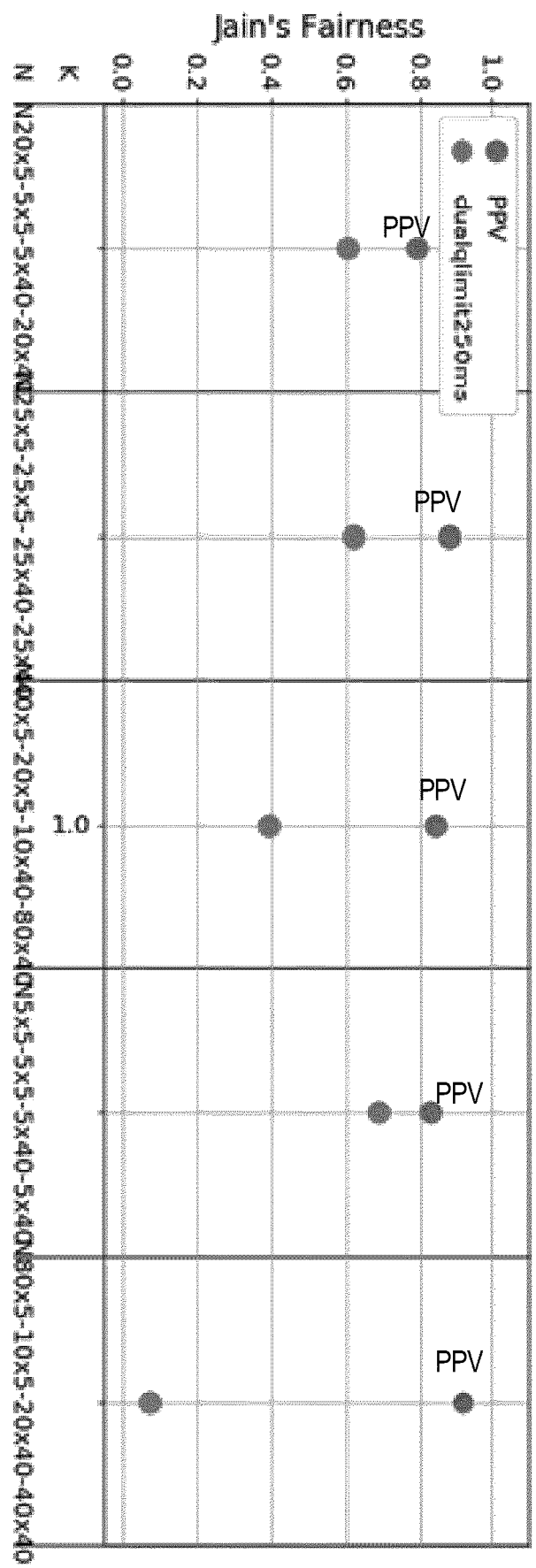

Jain's fairness metric (or index) is another criterion for indicating whether users or applications are receiving a fair share of system resource (e.g., in a bottleneck scenario). FIG. 7 depicts the per-flow Jain's fairness for the same scenarios shown in FIG. 6. When looking at FIG. 7, it is apparent that the exemplary embodiments labelled "PPV" have Jain's fairness metrics that are closer to the desirable 1.0 than the corresponding metrics for the same combinations based on the reference L4S method labelled "dualqlimit250 ms".

The embodiments described above can be further illustrated by the exemplary method (e.g., procedure) shown in FIG. 8, described below. For example, features of various embodiments discussed above are included in various operations shown in FIG. 8.

Figure 8A:
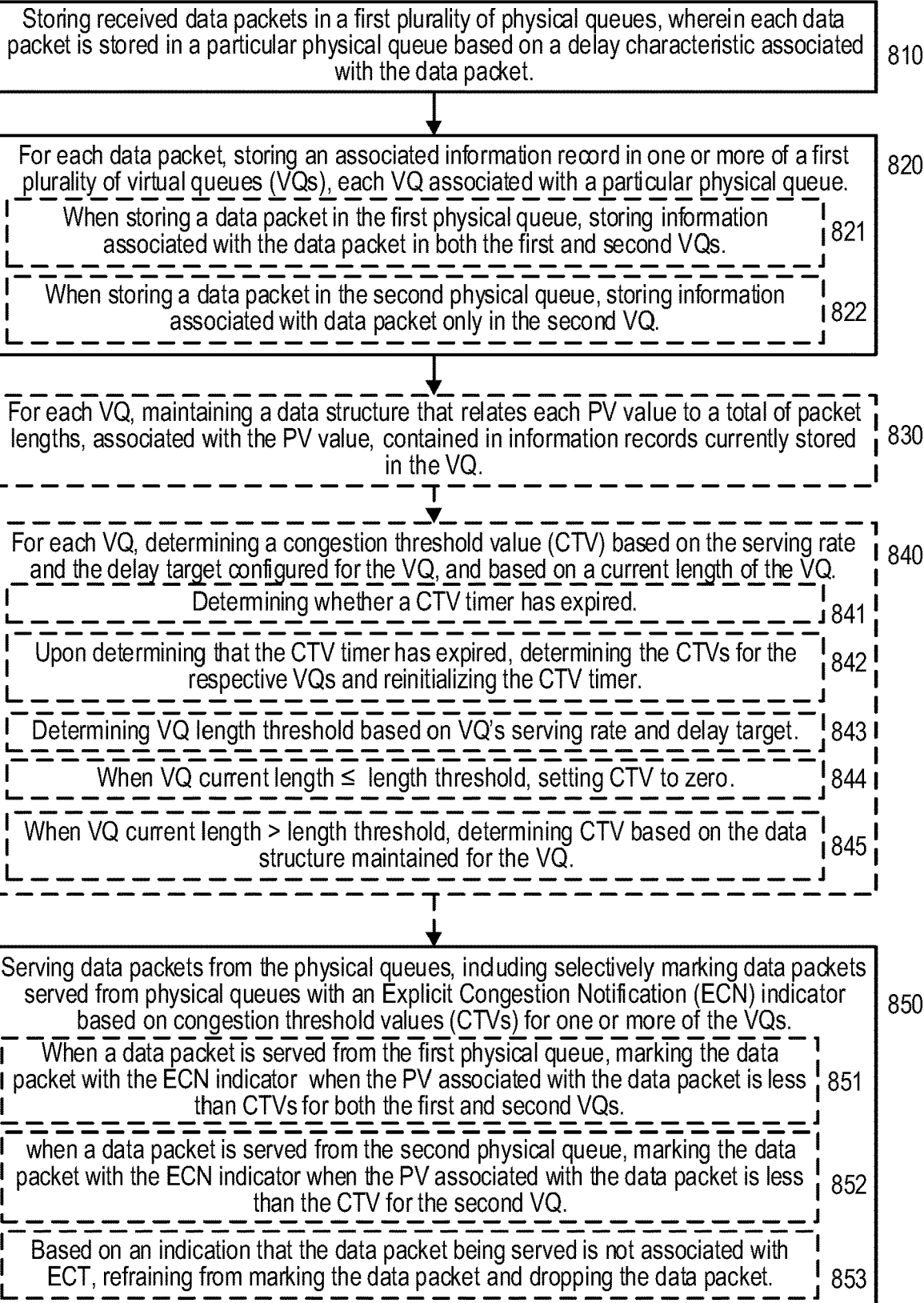
FIGS. 8A-B, illustrates an exemplary method (e.g., procedure) performed by a communication node, according to various exemplary embodiments of the present disclosure.
Figure 8B:
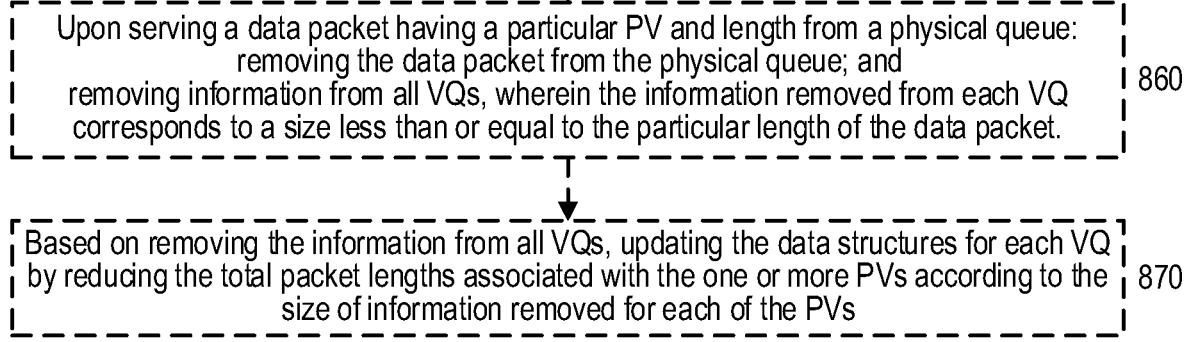

In particular, FIG. 8 (which includes FIGS. 8A-B) illustrates an exemplary method (e.g., procedure) for handling data packets in a communication network, according to various exemplary embodiments of the present disclosure. For example, the exemplary method shown in FIG. 8 can be implemented by a communication node (e.g., in and/or configured for the communication network) configured as described herein with reference to other figures. In addition, the exemplary method shown in FIG. 8 can be used cooperatively with other exemplary methods described herein (e.g., FIGS. 3-4) to provide various exemplary advantages described here. Although FIG. 8 shows specific blocks in a particular order, the operations of the exemplary method can be performed in a different order than shown and can be combined and/or divided into blocks having different functionality than shown. Optional blocks or operations are indicated by dashed lines.

The exemplary method shown in FIG. 8 can includes the operations of blocks 810-820. In block 810, the communication node can store received data packets in a first plurality of physical queues. Each data packet can be stored in a particular physical queue based on a delay characteristic associated with the particular data packet. In block 820, the communication node can, for each received data packet, store an associated information record in one or more of a first plurality of virtual queues (VQs). Each VQ can be associated with a particular physical queue, such as shown in FIG. 5. The exemplary method can also include the operations of block 850, where the communication node can serve data packets from the physical queues, wherein serving the data packets comprises selectively marking data packets served from physical queues with an Explicit Congestion Notification (ECN) indicator based on respective congestion threshold values (CTVs) for one or more of the VQs.

In some embodiments, the first plurality of physical queues includes first and second physical queues, the first plurality of VQs includes first and second VQs, and the information record associated with each data packet can include a packet value (PV) and a packet length. Examples of such embodiments are illustrated in FIG. 5. In some of these embodiments, the PV can indicate a drop precedence associated with the received data packet. In some of these embodiments, the PV can be embedded within the received data packet.

In some embodiments, the operations of block 820 can include the operations of sub-block 821-822. In sub-block 821, the communication node can, when storing a particular data packet in the first physical queue, store the associated information record in both the first and second VQs. In sub-block 822, the communication node can, when storing a particular data packet in the second physical queue, store the associated information record only in the second VQ. This arrangement is illustrated in FIG. 5.

In some embodiments, the first physical queue can be associated with an ultra-low queueing latency, ultra-low loss, scalable throughput (L4S) service, and the second physical queue can be associated with a best-effort service. In some embodiments, the plurality of physical queues can be served according to a strict priority criterion whereby the first physical queue is served when it stores at least one data packet and the second physical queue is only served when the first physical queue stores no data packets. In some embodiments, each of the physical queues can be a first-in-first-out (FIFO) queue for received data packets, and each of the VQs can be a FIFO queue for the associated information records.

In some embodiments, the PV for each data packet can be any of a second plurality of values. In such embodiments, the exemplary method can also include the operations of block 830, where the communication node can, for each VQ, maintain a data structure that relates each particular value, of the second plurality, to a total of packet lengths, associated with the particular value, contained in information records currently stored in the VQ. In some embodiments, the data structure can be a histogram, such as histograms $H_{IN}i$ associated with respective VQi discussed above. In some of these embodiments, the exemplary method can also include the operations of block 860, where the communication node can, upon serving a data packet having a particular PV and a particular length from a particular physical queue (e.g., in block 850), remove the data packet from the particular physical queue and remove information from all VQs. The information removed from each VQ can correspond to a size less than or equal to the particular length of the data packet. In some embodiments, the removed information can correspond to information records associated with one or more received data packets having respective one or more PVs.

In some embodiments, for each VQ (e.g., VQi), the size of the removed information can be determined based on a ratio between a serving rate of the VQ (e.g., Cvi) and a bottleneck rate for serving the physical queues (e.g., C). In some embodiments, the exemplary method can also include the operations of block 870, where the communication node can, based on removing the information from all VQs, update the data structures for each VQ by reducing the total packet lengths associated with the one or more PVs according to the size of information removed (from the VQ) for each of the PVs.

In some of these embodiments, a particular physical queue can be determined to be full when a sum of the numbers of bytes associated with all PVs in the data structure of the associated VQ is greater than a maximum length configured for the associated VQ.

In some embodiments, selectively marking the data packets in block 850 can include the operations of sub-block 851, where when a data packet is served from the first physical queue, the communication node can mark the data packet with an ECN indicator when the PV associated with the data packet is less than the CTVs for both the first and second VQs, e.g., PV<min(CTV0, CTV1) as discussed above. In some embodiments, selectively marking the data packets in block 850 can include the operations of sub-block 852, where when a data packet is served from the second physical queue, the communication node can mark the data packet with an ECN indicator when the PV associated with the data packet is less than the CTV for the second VQ, e.g., PV<CTV1 as discussed above.

In some embodiments, selectively marking the data packets in block 850 can also include the operations of sub-block 853, where based on an indication that the data packet being served from a physical queue is not associated with ECN capable transport (ECT), the communication node can refrain from marking the data packet and, instead, drop the data packet. In other words, the communication node can refrain from marking a data packet that meets either of the criteria in sub-blocks 851-852 if the data packet is labeled non-ECT (or not labelled ECT).

In some embodiments, the VQs can be configured with respective delay targets, serving rates, and maximum lengths. In such embodiments, the serving rate for the first VQ is not greater than the serving rate for the second VQ. In some of these embodiments, the exemplary method can also include the operations of block 840, where the communication node can, for each VQ, determine the CTV based on the serving rate and the delay target configured for the VQ, and based on the current length of the VQ.

In some embodiments, the operations of block 840 can include the operations of sub-blocks 841-842. In sub-block 841, the communication node can determine whether a CTV timer has expired. In sub-block 842, the communication node can, upon determining that the CTV timer has expired, determine the CTVs for the respective VQs and reinitialize the CTV timer.

In some embodiments, the operations of block 840 can include the operations of sub-blocks 843-844 for each VQ. In sub-block 843, the communication node can determine a VQ length threshold based on the VQ's serving rate and delay target. In sub-block 844, the communication node can, when the current length of the VQ is not greater than the VQ length threshold, set the CTV to zero. In some embodiments, the operations of block 840 can also include the operations of sub-block 845 for each VQ, where the communication node can, when the current length of the VQ is greater than the VQ length threshold, determine the CTV based on a data structure that relates each PV, of a plurality of PVs, to a total of the packet lengths, associated with the PV, contained in information records currently stored in the VQ. The data structure can be the same one that is maintained in block 830, discussed above.

In some embodiments, determining the CTV for each VQ based on the data structure in sub-block 845 can include various operations. For example, the communication node can, starting with the largest PV, sum (e.g., accumulate) the total packet lengths associated with progressively smaller PVs and compare each sum with the VQ length threshold (e.g., determined in sub-block 843). In addition, the communication node can select, as the CTV, a first PV that is a next larger PV to a second PV for which the sum exceeds the VQ length threshold. An example of such a selection criterion is given by equation (4), above.

Although the subject matter described herein can be implemented in any appropriate type of system using any suitable components, various exemplary embodiments disclosed herein can be implemented by communication nodes (also referred to as "network devices" or NDs) shown in FIG. 9, including FIGS. 9A-9F described below.

Figure 9A:
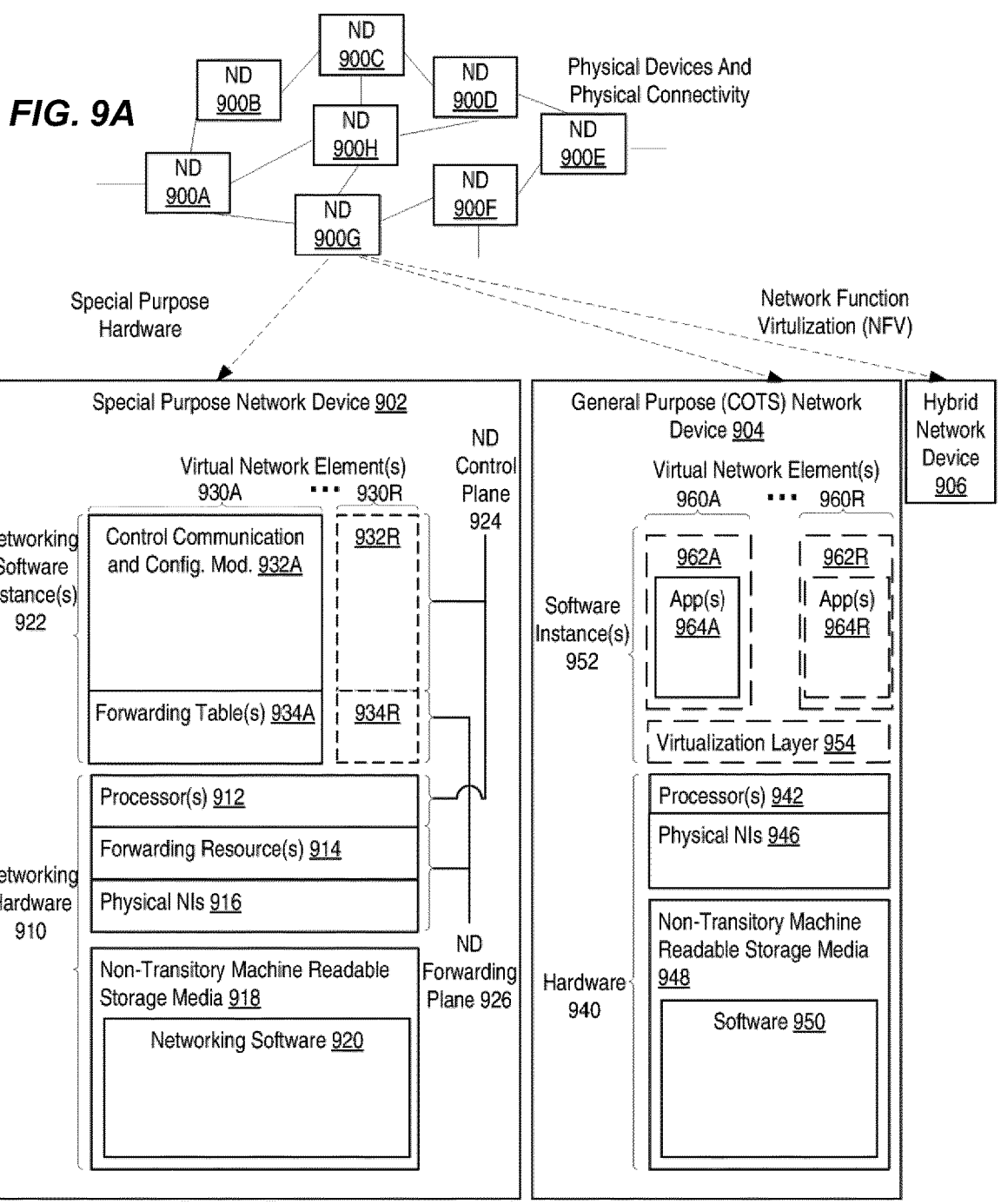

FIG. 9A illustrates connectivity between network devices (NDs) within an exemplary network, as well as three exemplary implementations of the NDs, according to some embodiments of the present disclosure. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900O, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs). Each network device may be the node 100 implementing the methods 300-600. Two of the exemplary ND implementations in FIG. 9A are: 1) a special-purpose network device 902 that uses custom application-specific integrated-circuits (ASICs) and a special-purpose operating system (OS); and 2) a general-purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine-readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). The networking software 920 may implement methods 300-600 in one embodiment and the packets to be processed are the packets received at special-purpose network device 902.

The special-purpose network device 902 can be physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
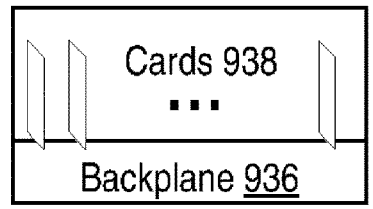

FIG. 9B illustrates an exemplary way to implement the special-purpose network device 902 according to some embodiments of the present disclosure. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general-purpose network device 904 includes hardware 940 comprising a set of one or more processor(s) 942 (which are often COTS processors) and physical NIs 946, as well as non-transitory machine-readable storage media 948 having stored therein software 950. During operation, the processor(s) 942 execute the software 950 to instantiate one or more sets of one or more applications 964A-R. The networking software 920 may implement methods 300-600 in one embodiment, and the packets to be processed are the packets received at the general-purpose network device 904. While one embodiment does not implement virtualization, alternative embodiments may use different forms of virtualization.

For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization of the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R. The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the present disclosure are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used. In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that implements the functionality of the special-purpose network device 902) could provide for para-virtualization to the networking hardware present in the hybrid network device 906. Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical Nis (e.g., 916, 946) and forwards that data out to the appropriate ones of the physical Nis (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 9C illustrates various exemplary ways in which VNEs may be coupled according to some embodiments of the present disclosure. FIG. 9C shows VNEs 970A. I-970A.P (and optionally VNEs 970A.Q-970A.R) implemented in ND 900A and VNE 970H. I in ND 900H. In FIG. 9C, VNEs 970A. I-P are separate from each other in the sense that they can receive packets from outside ND 900A and forward packets outside of ND 900A; VNE 970A. I is coupled with VNE 970H. I, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service— e.g., one or more layer 4-7 network services).

While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs). The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VoIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs.

For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general-purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NYE) sits at the edge of the underlay network and participates in implementing the network virtualization; the network-facing side of the NYE uses the underlay network to tunnel frames to and from other NYEs; the outward-facing side of the NYE sends and receives data to and from systems outside the network. A virtual network instance (VNI) is a specific instance of a virtual network on a NYE (e.g., a NE/VNE on an ND, a part of a NE/VNE on a ND where that NE/VNE is divided into multiple VNEs through emulation); one or more VNis can be instantiated on an NYE (e.g., as different VNEs on an ND). A virtual access point (V AP) is a logical connection point on the NYE for connecting external systems to a virtual network; a V AP can be physical or virtual ports identified through logical interface identifiers (e.g., a VLAN ID).

Examples of network services include: I) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the present disclosure. Specifically, FIG. 9D illustrates network elements (NEs) 970A-H with the same connectivity as the NDs 900A-H of FIG. 9A. FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics.

Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general-purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. Note that the centralized reachability and forwarding information module 979 may implement various methods (e.g., procedures) described herein in one embodiment, and the packets to be processed are the packets received at the network controller 978.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the present disclosure, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general-purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the present disclosure, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general-purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the present disclosure. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the present disclosure may perform neighbor discovery and topology discovery via both the centralized control plane and the distributed protocols, and the results compared to the raise exceptions where they do not agree. Such embodiments are generally considered to fall under the centralized approach 974 but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970! in one of the virtual network(s) 992 of FIG. 9D, according to some embodiments of the present disclosure. FIG. 9E shows that in this virtual network, the NE 970! is coupled to NE 970D and 970F, which are both still coupled to NE 970E. FIG. 9F illustrates a case where multiple VNEs (VNE 970A.I and VNE 970H.I) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the present disclosure. Thus, the abstraction of a NE or VNE can span multiple NDs.

While some embodiments of the present disclosure implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
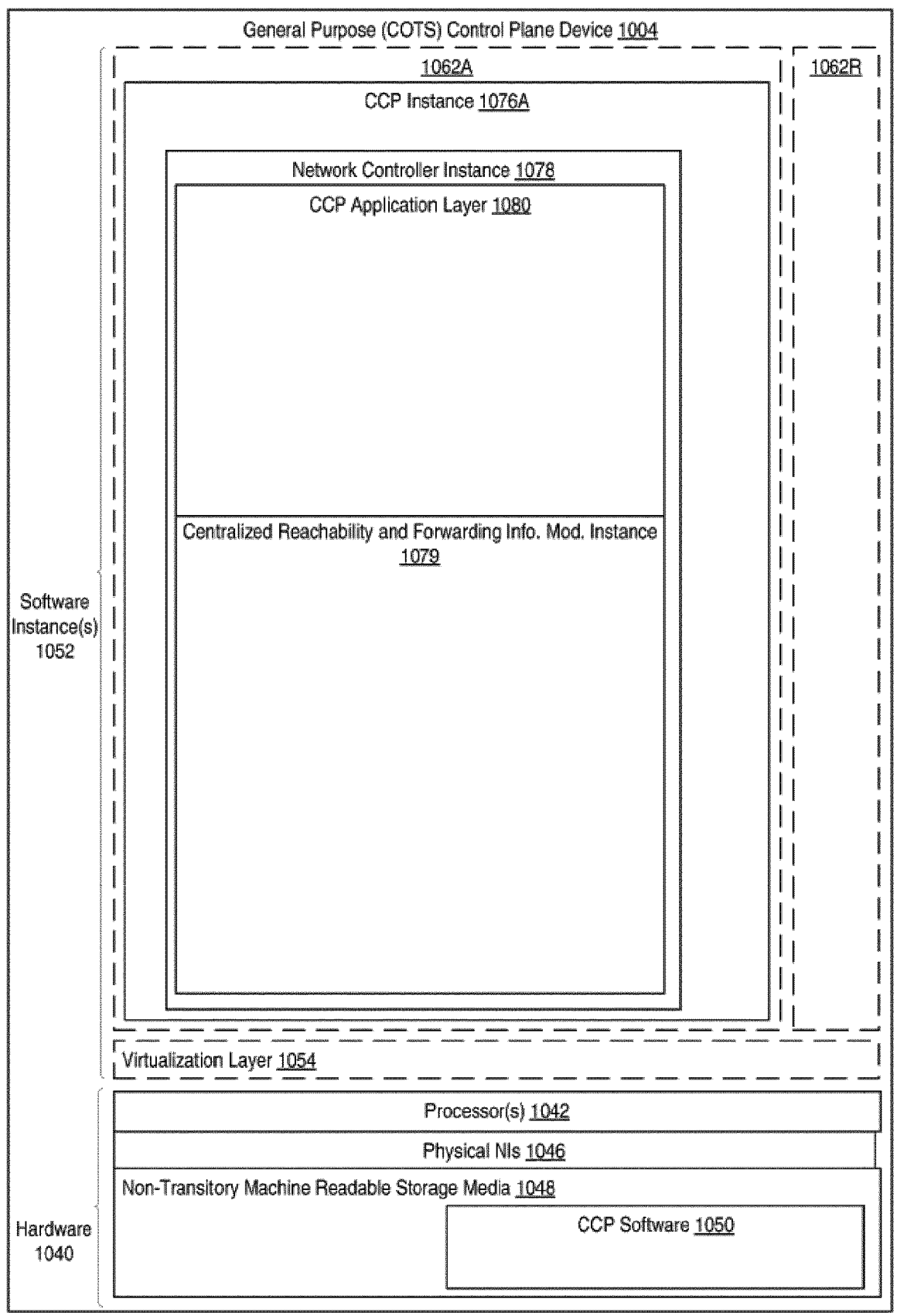
FIG. 10 illustrates various aspects of other network devices or communication nodes, according to various exemplary embodiments of the present disclosure.

Similar to the network device implementations, the electronic device(s) running the centralized control plane 976, and thus the network controller 978 including the centralized reachability and forwarding information module 979, may be implemented in a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general-purpose control plane device 1004 including hardware 1040 comprising a set of one or more processor(s) 1042 (which can be COTS processors) and physical NIs 1046, as well as non-transitory machine-readable storage media 1048 having stored therein centralized control plane (CCP) software 1050. Note that the CCP software 1050 may implement methods 300-600 in one embodiment, and the packets to be processed are the packets received at the general-purpose control plane device 1004.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only with a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general-purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view. The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., IO or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet. However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NENNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., L3 addressing). The subscriber records in the AAA server identify, in addition to the other subscriber configuration requirements, to which context (e.g., which of the VNEs/ NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software.

In addition, a device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. As such, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Other variations to the disclosed embodiments can be understood and effected by those skilled in the art in practicing the claimed invention, from a study of the drawings, the disclosure, and the appended claims. In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope thereof.

The invention claimed is:

1. A method for handling data packets by a communication node in a communication network, the method comprising:
receiving data packets having low latency requirements and data packets having high latency requirements;
storing received low latency data packets in a first physical queue of at least two physical queues,
storing received high latency data packets in a second physical queue of the at least two physical queues;
storing an associated information record for the low latency data packets in a first virtual queue and a second virtual queue of at least two virtual queues, VQs;
storing an associated information record for the high latency data packets in the second virtual queue of at the least two virtual queues, VQs;
serving the received and stored low latency data packets and received and stored high latency data packets from the at least two physical queues, using at least two Congestion Threshold Values, CTVs, wherein a first CTV of said at least two CTVs is applicable to low latency data packets in said first physical queue and wherein both said first CTV and second CTV of said at least two CTVs are applicable to low latency data packets and high latency data packets, wherein said at least two CTVs are used for at least one of dropping and marking packets based on their associated information record.

2. The method in accordance with claim 1, wherein the information record associated with each data packet includes a packet value, PV, and a packet length.

3. The method in accordance with claim 1, wherein:
the first of said at least two physical queues is associated with an ultra-low queueing latency, ultra-low loss, scalable throughput, L4S, service;
the second of said at least two physical queues is associated with a best-effort service.

4. The method in accordance with claim 2, wherein the information record associated with each data packet includes a packet value, PV, and a packet length; and
   wherein the PV indicates a drop precedence associated with the received data packet.

5. The method in accordance with claim 2, wherein the information record associated with each data packet includes a packet value, PV, and a packet length; and
   wherein the PV is embedded within the received data packet.

6. The method in accordance with claim 1, wherein said step of serving further comprises serving data packets in said first of said at least two physical queues when it stores at least one data packets and serving the second of said at least two physical queues when the first of the at least two physical queues stores no data packets.

7. The method in accordance with claim 2, wherein the information record associated with each data packet includes a packet value, PV, and a packet length; and wherein marking packets based on their associated information comprises:
   when a data packet is served from the first of the at least two physical queues, marking the data packet with an ECN indicator when the PV associated with the data packet is less than CTVs for the first and the second of said at least two CTVs; and
   when a data packet is served from the second physical queue, marking the data packet with the Explicit Congestion Notification, ECN, indicator when the PV associated with the data packet is less than the second of said at least two CTVs.

8. The method in accordance with claim 1, wherein marking the packets further comprises, based on an indication that the data packet being served from a physical queue is not associated with ECN capable transport (ECT), refraining from marking the data packet and dropping the data packet.

9. The method in accordance with claim 1, wherein:
   the VQs are configured with respective delay targets, serving rates, and maximum lengths; and
   the serving rate for the first VQ is not greater than the serving rate for the second VQ.

10. The method in accordance with claim 9, further comprising, for each VQ, determining the corresponding CTV based on the serving rate and the delay target configured the VQ, and based on a current length of the VQ.

11. The method in accordance with claim 10, wherein determining the CTV comprises:
    determining whether a CTV timer has expired; and
    upon determining that the CTV timer has expired, determining the CTVs for the respective VQs and reinitializing the CTV timer.

12. The method in accordance with claim 11, wherein for each VQ, determining the CTV comprises:
    determining a VQ length threshold based on the VQ's serving rate and delay target; and
    when the current length of the VQ is not greater than the VQ length threshold, setting the CTV to zero.

13. The method in accordance with claim 12, wherein for each VQ, determining the CTV further comprises, when the current length of the VQ is greater than the VQ length threshold, determining the CTV based on a data structure that relates each PV, of a plurality of PVs, to a total of the packet lengths, associated with the PV, contained in information records currently stored in the VQ.

14. The method in accordance with claim 13, wherein for each VQ, determining the CTV based on the data structure comprises:
    starting with the largest PV, summing the total packet lengths associated with progressively smaller PVs and comparing each sum with the VQ length threshold; and
    selecting, as the CTV, a first PV that is a next larger PV to a second PV for which the sum exceeds the VQ length threshold.

15. The method in accordance with claim 14, wherein:
    the PV for each data packet can be any of a second plurality of values; and
    the method further comprises, for each VQ, maintaining a data structure that relates each particular value, of the second plurality, to a total of packet lengths, associated with the particular value, contained in information records currently stored in the VQ.

16. The method in accordance with claim 15, wherein the data structure is a histogram.

17. The method in accordance with claim 16, further comprising, upon serving a data packet having a particular PV and a particular length from a particular physical queue,
    removing the data packet from the particular physical queue; and
    removing information from all VQs, wherein the information removed from each VQ corresponds to a size less than or equal to the particular length.

18. The method in accordance with claim 17, wherein the removed information corresponds to information records associated with one or more received data packets having respective one or more PVs.

19. The method in accordance with claim 18, further comprising, based on removing the information from all VQs, updating the data structures for each VQ by reducing the total packet lengths associated with the one or more PVs according to the size of information removed for each of the PVs.

20. The method in accordance with claim 19, wherein for each VQ, the size of the removed information is determined based on a ratio between a serving rate of the VQ and a bottleneck rate for serving the physical queues.

21. The method in accordance with claim 20, wherein a particular physical queue is determined to be full when a sum of the numbers of bytes associated with all PVs in the data structure of the associated VQ is greater than a maximum length configured for the associated VQ.

22. The method in accordance with claim 21, wherein:
    each of the physical queues is a first-in-first-out, FIFO, queue for received data packets; and
    each of the VQs is a FIFO queue for the associated information records.

23. A communication node for a communication network, the communication node comprising:
    interface circuitry configured to communicate with one or more other communication nodes in the communication network and receive low latency data packets and high latency data packets; and
    processing circuitry operably coupled to the interface circuitry, whereby the processing circuitry and interface circuitry are configured to store received low latency data packets in a first physical queue of at least two physical queues, and store received high latency data packets in a second physical queue of said at least two physical queues;
    for each received low latency data packet, store an associated information record in both said first and second virtual queue of at least two virtual queues, VQs, and for each received high latency data packet, store an associated information record in the second virtual queue of the at least two virtual queues;

serve data packets from the at least two physical queues, using at least two Congestion Threshold Values, CTVs, wherein a first CTV of said at least two CTVs is applicable to the low latency data packets and wherein both said first CTV and second CTV of said at least two CTVs are applicable to low latency data packets and high latency data packets wherein said at least two CTVs are used for at least one of dropping and marking packets based on their associated information record.

24. The communication node of claim 23, further comprising a plurality of physical queues operable to store received data packets and from which the stored data packets can be served by the communication node.

25. A non-transitory, computer-readable medium storing computer-executable instructions that, when executed by processing circuitry of a communication node for a communication network, is configured to store received low latency data packets in a first physical queue of at least two physical queues, and store received high latency data packets in a second physical queue of said at least two physical queues;

for each received low latency data packet, store an associated information record in both a first virtual queue and a second virtual queue of at least two virtual queues, VQs, and for each high latency data packet, store an associated information record in the second virtual queue of said at least two virtual queues; and serve data packets from the at least two physical queues, using at least two Congestion Threshold Values, CTVs, wherein a first CTV of said at least two CTVs is applicable to low latency data packets and wherein both said first CTV and second CTV of said at least two CTVs are applicable to both low latency data packets and high latency data packets, wherein said at least two CTVs are used for at least one of dropping and marking packets based on their associated information.

* * * * *